United States Patent
Von Berckheim

[15] 3,662,217
[45] May 9, 1972

[54] VEHICLE CONSTRUCTION

[72] Inventor: Constantin Graf Von Berckheim, Friedrichstrasse 9, 694 Weinhein a.d.B., Germany

[22] Filed: Dec. 17, 1970

[21] Appl. No.: 99,098

[30] Foreign Application Priority Data

Dec. 22, 1969 Germany ................P 19 64 069.8

[52] U.S. Cl. ..........................317/4, 317/262 AE
[51] Int. Cl. ...................................H01t 19/00
[58] Field of Search ...............317/2 R, 2 D, 4, 262 AE; 128/422

[56] References Cited

UNITED STATES PATENTS 3,541,390  11/1970  Jahnke ............................317/4
3,311,108  3/1967  Cristofv et al ....................317/4 X

*Primary Examiner*—L. T. Hix
*Assistant Examiner*—Harry E. Moose, Jr.
*Attorney*—Michael S. Striker

[57] ABSTRACT

An automotive vehicle has a passenger compartment provided in a window opening provided with a windowpane which is electrically conductive at least on the side facing the interior of the compartment. At least one air supply channel is provided which discharges a stream of air along the inner side of the window and an ion-producing device is provided in the channel upstream of the window for enriching the stream of air with ions. An arrangement may also be provided for establishing and maintaining the interior of the compartment an electrostatic field.

12 Claims, 4 Drawing Figures

PATENTED MAY 9 1972  3,662,217
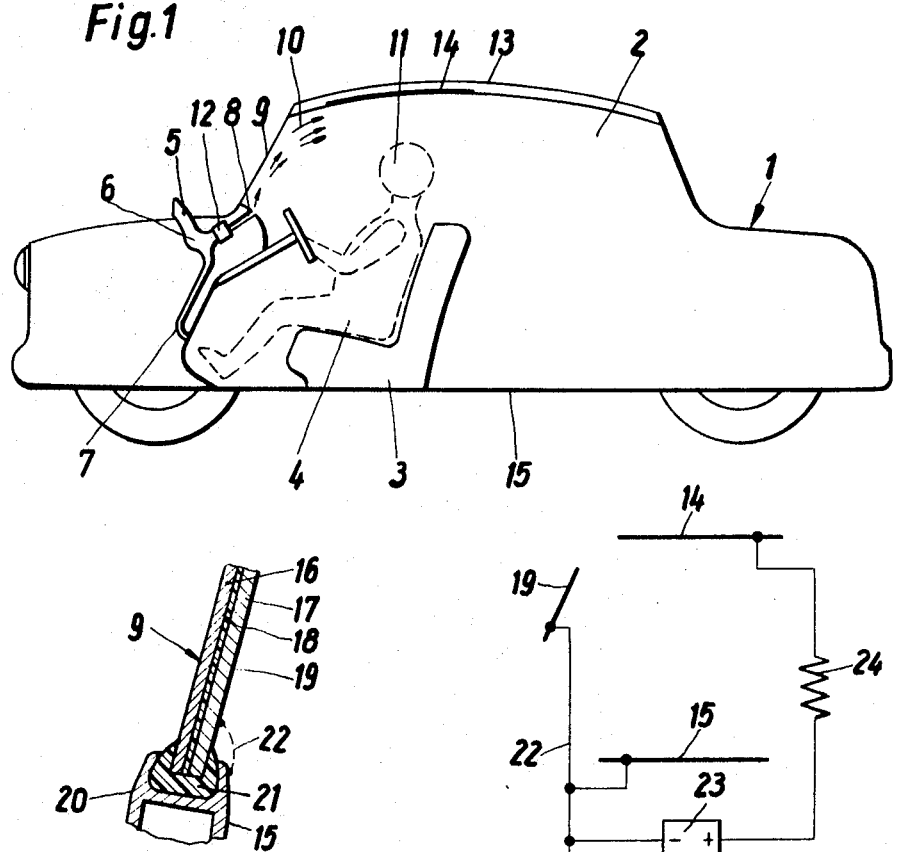
Inventor:
CONSTANTIN GRAF VON BERCKHEIM

VEHICLE CONSTRUCTION

BACKGROUND OF THE INVENTION

The present invention relates generally to vehicles, and more particularly to automotive vehicles. Still more particularly the present invention relates to an automotive vehicle provided with an air-supply channel which discharges a stream of air along the inwardly directed side of a windowpane.

Most modern automotive vehicles are provided with a ventilating system which supplies fresh air to the interior of their passenger compartment, and removes stale air therefrom. In most instances the ventilating system is combined with the heating system in such a manner that the incoming fresh air can be warmed to a desired temperature before it is discharged into the interior of the passenger compartment. These systems generally use air discharge openings, nozzles or the like provided at different locations of the vehicle body within the passenger compartment, and discharging streams of the air into the interior of the compartment. The arrangement generally is such that one or several or all of these discharge openings can be used, at the option of a vehicle occupant, and one or more of the nozzles associated with such openings are usually made adjustable so that the air discharged by them can be directed to different points of the compartment. One reason for making such provisions for adjustability is to permit the air to be directed against the inner side of one or more of the windows of compartment, in order to reduce or clear up fogging or icing of the windows.

It is also known from the prior art to provide vehicles, including and particularly automotive vehicles, with an arrangement for establishing in the interior of the passenger compartment an electrostatic field. The purpose is to beneficially influence the human occupants of the compartment, and the theoretical considerations behind this are based on the realization—which has long been known—that such fields can imitate the conditions existing at high-elevation mountain altitudes, conditions which demonstrably increase the well-being of humans. For instance, electrostatic fields of this type reduce or remove the presence of dust and aerosols in the air of the passenger compartment, they reduce sleepiness and have other beneficial advantages which are desirable for the occupants of the vehicle, and of course particularly for the vehicle operator who is charged with special need for alertness. Such fields are established by providing two electrodes, one of which may be the electrically conductive body of the vehicle itself, which are maintained at different potentials.

SUMMARY OF THE INVENTION

It is a general object of the present invention to provide a vehicle, particularly an automotive vehicle, which includes an arrangement for further facilitating the well-being of the occupants of the vehicle.

More particularly it is an object of the present invention to provide such a vehicle wherein the passenger compartment — the term is intended to include the space for the vehicle operator, whether or not he is physically in the same area as others who are present in the vehicle in a nonoperating capacity— with ions, and to do so at high effectiveness but with little technological and economic expenditure.

A concomitant object of the invention is to provide such a vehicle which is simple in its construction.

In pursuance of the above objects, and others which will become apparent hereafter, one feature of the invention resides in a vehicle, particularly an automotive vehicle, which in combination comprises a body surrounding a passenger compartment and including at least one window opening, and at least one air supply channel oriented for discharging a stream of air along the inner side of the window opening. An ion-producing device is associated with the channel upstream of the window opening for enriching the stream of air with ions, and a windowpane is mounted in the window and is electrically conductive at least at its side facing the interior of the compartment, being at an electric potential requisite for repelling ions of a predetermined polarity.

The invention bases on the realization that an increase in the presence of ions, particularly negative ions, in the air breathed by human beings positively effects the well-being of such persons. This is irrespective whether or not the person or persons in question are at this time subjected to the influence of an electrostatic field as disclosed above. The provision of ions in the air they breath, if in conjunction with their exposre to an electrostatic field, will in fact further influence the effect of well-being.

By resorting to the present invention the air which is supplied to the interior of the passenger compartment for ventilating and/or heating purposes, is utilized to introduce ions into the compartment but is not in any way prevented from fulfilling its other functions, namely the ventilating and/or heating function on the one hand, and the anti-fogging or de-icing function. The incoming air can still come in contact with the inner side of the window or windows in question, but the ions which it carries and which have the desired polarity cannot become discharged at this window and become ineffective as a result thereof. Instead, by far the greatest proportions of these ions moves along the window upwardly and thus reaches the head region of the compartment, that is the region where the head of a passenger will normally be located so that these ions will then be breathed in by the passenger, and particularly by the vehicle operator.

Of course it will be appreciated that the supply of the greatest proportion of the incoming ions to the region where they are most needed, namely to the region where the passenger takes in air which he breathes, means that it is possible to utilize in the present invention an ion producing device which is relatively small because it needs to produce only a very small quantity of ions and therefore can be cheap and simple.

If the ions are produced by radioactive emanations or as a result of UV-rays (ultraviolet), very low radiation energies are sufficient for purposes of the present invention. If the ions are produced by discharges in an electric field, relatively low potentials are required. This is particularly important when one considers that the invention is concerned with vehicles, and particularly automotive vehicles, because in such vehicles there is usually only a very small amount of space available for such auxiliary equipment, and also because it is desirable that the additional expenses involved for providing such equipment be kept at a minimum.

Usually it is desired that ions of only one polarity be provided, particularly negative ions. Known ion-producing devices are thus so constructed that they yield only ions of one potential, for instance by providing the ion-producer with a catch electrode whose potential is so selected that it attracts ions of the undesired polarity and discharges them. However, this electrode can be replaced by the windowpane utilized according to the present invention because ions of undesired polarity become discharged at this window, so that the window can partially or completely substitute for the catch electrode.

It is advantageous for supplying the passenger compartment with negative ions, if the electrically conductive windowpane is a portion of a system having at least two electrodes, and in which the pane is at a lower potential than another electrode. Thus, the ions carried along by the airstream are repelled from the window and moved in direction towards the other electrode by a flow of ions through the interior of the passenger compartment is obtained. It is particularly advantageous if the other electrode is a ceiling electrode which is mounted at or in the region of the ceiling of the passenger compartment and which is at a higher potential than the body of the vehicle, in order to obtain an electrostatic field in the interior of the passenger compartment. Thus, the negative ions repelled by the windowpane and moving in direction towards the ceiling electrode, are brought in particularly substantial quantities into the region of the head of the passengers including the vehicle operator, where they will be breathed. The windowpane may be electrically conductively connected with the body of the vehicle.

According to a further embodiment of the invention the body of the vehicle itself may be the other electrode which is at a first potential, and another electrode may be provided in the interior of the passenger compartment at the floor, and/or on a seat and be at a lower potential than the body of the vehicle. This then establishes an electrostatic field between these two electrodes and negative ions which move upwardly along the windowpane, are moved to the region of the head of the passengers, particularly of the vehicle operator, under the influence of the electrostatic field emanating from the roof of the vehicle body. In such a construction the windowpane should be electrically insulated with reference to the vehicle body.

It is advantageous that the windowpane is connected with a source of electrical energy via a high-ohmic resistor because this assures that contact with the windowpane does not result in an electric shock.

It is preferred currently, but not absolutely necessary, that the windowpane have at least one non-conductive outer layer and be provided on the inner side of this outer layer with an inner layer which is transparent and which is electrically conductive. This layer may in known manner consist of a vapor-deposited metal. Advantageously the layer will be an anti-reflection layer which at the same time is electrically conductive, because then it will have the additional function of resisting excessive entry of light into the interior of the vehicle, for instance glare on a very sunny day. However, it is also possible to make the windowpane electrically conductive in other ways, for instance by adding to the glass—if it is made of glass—electrically conducive additives.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 1 is a diagrammatic longitudinal elevation through a vehicle embodying one embodiment of the invention;

FIG. 2 is a fragmentary transverse vertical section through a windshield of the vehicle shown in FIG. 1;

FIG. 3 is a simplified circuit-diagrammatic showing illustrating how the windshield can be connected to a source of energy; and FIG. 4 is a view similar to FIG. 3 illustrating a further possibility for a connection.

DESCRIPTION OF THE PREFERRED EMBODIMENTS

Discussing now the drawing in detail, and firstly the embodiment in FIGS. 1-3, it will be seen that a vehicle, here identified as an automotive vehicle, as designated in toto with reference numeral 1. It has a passenger compartment 2 provided with seats 3 for occupants, here illustrated as the vehicle operator 4.

In conventional manner the vehicle 1 is provided with a ventilating arrangement having an air inlet opening 5, a distributor chamber 6 in which there may also be mounted a non-illustrated heater, and several air supply channels one of which is designated with reference numeral 7 and discharges air to the bottom region of the compartment 2, and one of which is designated with reference numeral 8 and discharges air in said passenger compartment across a window opening in which is mounted a windowpane or windshield 9. As the arrows 10 indicate, the air discharged from the channel 8 moves along and in contact with the inner side of the windshield 9 and upwardly to the region of the head 11 of the vehicle operator 4.

According to the invention an ion-producing device 12 is mounted in the channel 8, for instance a corona electrode, which is connected to such a voltage that corona discharge at the tip of the electrode results in the production of ions. It is also possible to use as an ion-producing device tritium, a UV-lamp or the like, or a combination of various such known possibilities. It is specifically emphasized that the construction and operation of such ion-producing devices per se is known to those skilled in the art.

The ceiling bounding the passenger compartment 2 is identified with reference numeral 13. Mounted on it, electrically insulated therefrom, is a ceiling electrode 14 which cooperates with a counter electrode, here provided by the body 15 of the vehicle. When these electrodes 14 and 15 are connected to a source of electrical energy, there develops between them and thus in the interior of the compartment 2 an electrostatic field which has a positive influence on the well-being of persons located within the field and therefore within the compartment 2, but which at the same time influences advantageously ions carried along in the air stream as will be discussed subsequently.

As FIG. 2 shows in a fragmentary enlarged detail section, the windshield 9 may be composed of laminated safety glass, that is in this illustrated embodiment of two layers 16 and 17 which are united with one another by an intermediate layer 18 of synthetic plastic material. The windowpane or windshield 9 is provided with electrical conductive means. The inner side of the windshield 9 is provided, in this embodiment, with a transparent vapor-deposited metallic layer 19 which is electrically conductive. The windshield 9 is mounted in a frame 20 of the body by means of a seal 21 which usually is of insulating character so that no electrical connection exists between the electrically conductive layer 9 and the body 20. However it is pointed out that if it should be desired, the seal 21 may be electrically conductive, or may be made electrically conductive by the addition to its material of conductive additives, so that in this case an electrically conductive connection 22 (shown by broken lines) would exist between the layer 19 and the body 20.

FIG. 3 shows a circuit diagram for the electrodes of FIGS. 1 and 2. It is assumed in this case that primarily negative ions are desired to be obtained in the compartment 2. Thus, the sealing electrode 14 and the counterelectrode 15 constituted by the body of the vehicle—and grounded via the tires—are connected to an electric field producing means comprising a source of direct current 23 having a positive and a negative pole to which the electrodes 14 and 15 are respectively connected. The body 15 is directly connected and the sealing electrode 14 is connected with the source via a high-ohmic limiting resistor 24.

The electrically conductive layer 19 of the windshield 9 is directly connected in conductive relationship with the body 15. If ions exit from the channel 18 together with the air stream, then any ions of positive polarity which may be included among them contact the layer 19 and become discharged. Ions of negative potential, on the other hand, are repelled by the layer 19 and move along with the air stream into the region of the head 11 of the operator 4, where they will be breathed. In this region the negative ions are under the attraction of the ceiling electrode 14 whereby the ions which are carried along by the gradually spreading air stream are primarily maintained in the upper region or ceiling region of the compartment 2, until finally they are attracted to the ceiling electrode 14 where they become discharged.

FIG. 4, finally, shows a further embodiment where it is assumed that the electrostatic field in the interior of the passenger compartment 2 is defined between a floor electrode 25 and the body 26 which again is grounded via the tires. Floor electrode 25 is connected to one pole of a direct-current source 28 via a high-ohmic limiting resistor 27, whereas the body 26 is connected to the other pole of the source 28. The source 28 here is provided with an intermediate tap 29 to which the electrically conductive layer 19 of the windshield 9 is connected via a limiting resistor 30. The layer 19 is therefore at a potential which is intermediate the potential of the electrode 25 and that of the electrode 26. The windshield and its layer 19 are each electrically insulated with reference to the body 26, and the operation is essentially the same as in the embodiment described with reference to FIGS. 1-3.

It is pointed out that the connection of the current source with the various electrodes, the use of high-ohmic or very-high-ohmic resistors, the establishment of an electrostatic field and the construction and operation of ion-producing devices are all known in themselves and that these features require no discussion because they will individually be known to those having skill in the art. It was not, until now, known however to provide the embodiments and arrangements according to the present invention with the purposes and advantages which have been outlined above.

It will be understood that each of the elements described above, or two or more together, may also find a useful application in other types of constructions differing from the types described above.

While the invention has been illustrated and described as embodied in a vehicle construction, it is not intended to be limited to the details shown, since various modifications and structural changes may be made without departing in any way from the spirit of the present invention.

Without further analysis, the foregoing will so fully reveal the gist of the present invention that others can be applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and designed to be protected by Letters Patent is set forth in the appended claims.

1. In a vehicle, particularly an automotive vehicle, in combination, a body surrounding a passenger compartment and including at least one window opening; at least one air supply channel oriented for discharging a stream of air in said passenger compartment across said opening; an ion-producing device associated with said channel upstream of said window opening for enriching the stream of air with ions; electric field producing means for producing an electric field in said compartment; and a windowpane in said window opening provided with electrically conductive means rendering said windowpane conductive at least along its side facing the interior of said compartment, and connected to said electric field producing means and maintained by the same at an electric potential requisite for repelling ions of a desired polarity, whereby to disperse the latter in said compartment, while serving as a catch electrode for ions of undesired polarity.

2. In a vehicle as defined in claim 1, and further comprising at least one counter electrode in said vehicle cooperating with said windowpane and having a potential which is higher than that of said windowpane.

3. In a vehicle as defined in claim 2, said passenger compartment having a ceiling; and wherein said counterelectrode is a ceiling electrode mounted in the region of said ceiling, said field producing means producing between said windowpane and said counterelectrode an electric field.

4. In a vehicle as defined in claim 3, said body being at least predominantly of electrically conductive material; and wherein said window pane is conductively connected with said body.

5. In a vehicle as defined in claim 1, said body being at least predominantly of electrically conductive material at a predetermined electric potential; and further comprising an additional electrode within said passenger compartment and having a lower electric potential than said predetermined potential.

6. In a vehicle as defined in claim 5, said passenger compartment having a floor; and wherein said additional electrode is provided in the region of said floor.

7. In a vehicle as defined in claim 5; further comprising at least one seat in said passenger compartment; and wherein said additional electrode is provided on said seat.

8. In a vehicle as defined in claim 5; and insulating means electrically insulating said windowpane from said body.

9. In a vehicle as defined in claim 1; said field producing means comprising a source of electric energy; and a high-ohmic resistor interposed in circuit between said source and said windowpane.

10. In a vehicle as defined in claim 1, said windowpane comprising at least one outer layer of electrically insulating transparent material having an inner side facing said passenger compartment, and an inner layer of transparent electrically conductive material on said inner side.

11. In a vehicle as defined in claim 10, wherein said inner layer is an anti-reflection material.

12. In a vehicle as defined in claim 1, further comprising a pair of additional electrodes spaced from each other, said field producing means comprising a source of electrical energy having a positive pole and a negative pole each connected to one of said additional electrodes to establish therebetween an electric field in said compartment, and further having a tap connected to said windowpane.

* * * * *